INVENTOR.
GEORGE E. STANTON
BY
Gordon H. Cheney
AGENT

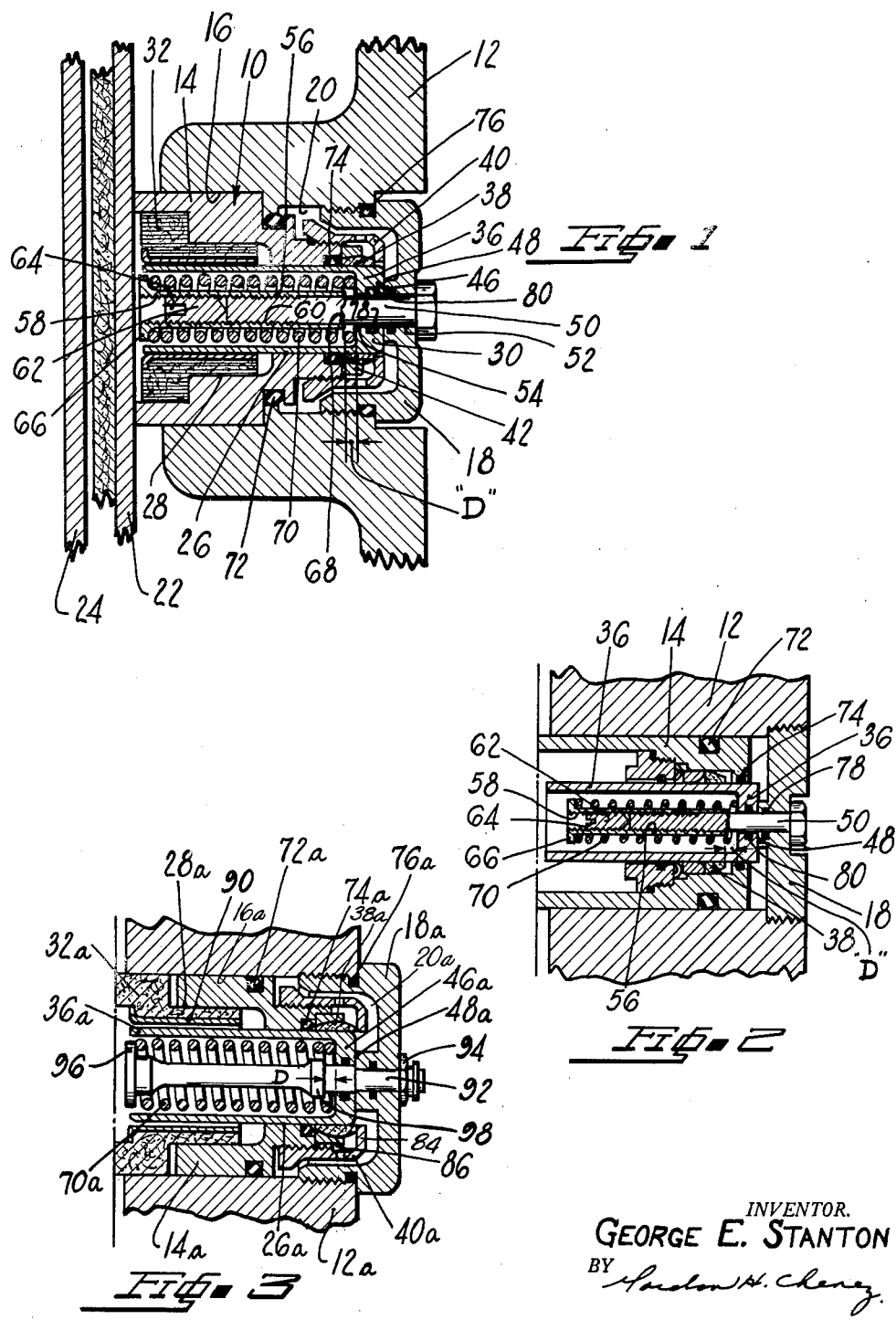

United States Patent Office 3,032,144
Patented May 1, 1962

3,032,144
COMBINATION ADJUSTER AND RESET
MECHANISM
George E. Stanton, South Bend, Ind., assignor to The
Bendix Corporation, a corporation of Delaware
Filed July 9, 1959, Ser. No. 826,076
3 Claims. (Cl. 188—72)

This invention relates generally to automatically operating adjusting means for disk brakes and in particular to an automatically operating brake adjusting device which adjusts the brake as wear occurs to maintain a predetermined brake clearance and which also acts to reset the brake to the predetermined clearance in the event that the predetermined clearance is lost due to "overadjustment" of the brake. The present invention is an improvement of the adjuster and reset mechanism disclosed in copending application Serial No. 572,855 filed March 21, 1956 in the name of James A. Tankersley and Paul Driscoll (common assignee) and provides advantages in addition to the features set forth in the aforementioned application which improve the reliability and consistency of the adjuster and reset mechanism.

As pointed out in application No. 572,855 which relates to a combination adjuster and reset device, the usual automatic adjuster for brakes is subject to serious disadvantage in that it may overadjust the brake such that the brake clearances are reduced. As a result of this overadjustment, the brakes are subject to locking in the applied condition and, if the vehicle is moving, subsequent drag and overheating of the brake. One of the reasons for overadjustment in brakes is that the adjuster mechanism operates during a brake application while the brake members are in a temporarily existing state of thermal and mechanical distortion. The adjuster functions with the brake members in this condition of distortion and thus when the brake is released and the brake members return to their original shape, then the adjustment operation has produced an inaccurate clearance. Because of this tendency for "overadjustment," it has been found advantageous to provide apparatus for resetting the brakes following a brake application in order to re-establish brake clearance. This resetting action is caused to occur by merely pushing on the brake pedal. Once the adjuster has reset the brake, this will relieve any dragging condition or locked condition of the brake. Also, one of the difficulties of combining a "reset" function with the automatic adjuster is a partial loss of the effective piston area which applies the brake.

The aforementioned application No. 572,855 discloses a combination adjuster and reset device in which a hydraulically actuated piston is bored to receive a positioning member which is frictionally connected to the piston. The piston and positioning member are preloaded by a spring interposed between a fixed stop member and a washer, the latter being secured to the positioning member by a snap ring. It has been found that during an application of the brake, if brake chatter is experienced and concomitant vibration of the brake as a whole occurs, the snap ring is subject to breaking under the high preload exerted by the spring. When this occurs the adjuster and reset device is rendered inoperative and it is necessary to remove and replace it with another one. In general, the present invention provides an alternative arrangement which alleviates this problem by removing the washer and snap ring entirely and substituting a positioning member which has a spring retainer integrally formed therewith. Thus, the present invention provides an improved version of the brake adjuster and reset device disclosed in application No. 572,855 whereby all of the advantages of the latter device are maintained with greatly increased reliability and trouble-free operation of the device.

It is an object of this invention to provide apparatus which will operate in conjunction with a fluid motor, to both adjust and reset the fluid motor and yet enable full utilization of the piston area for applying the motor.

Another object of this invention is to provide a compact and easily accessible adjuster and reset device which requires a relatively small space allocation in the carrier plate of a brake. It is well known that space limitations are highly important in certain types of brakes (for example, aircraft brakes) and it will be, therefore, appreciated that this feature is of considerable importance.

It is still another object of this invention to provide a rugged and reliable adjuster and reset device which is relatively trouble free and requires a minimum of maintenance and care.

Other objects and advantages of the invention will become apparent from the following description taken in connection with the following drawings, in which:

FIGURE 1 shows the adjuster and reset device in a fluid motor actuator for a brake, parts of the brake being shown in fragmentary section;

FIGURES 2, 3, 4 and 5 are modifications of the device shown in FIGURE 1 which are shown in section with the parts of the brake removed except the carrier plate of the brake.

Figure 4:
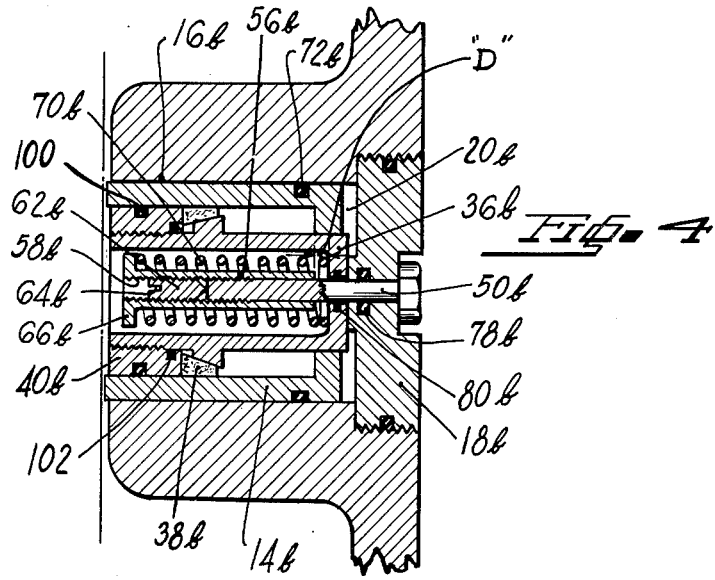

For a typical disk brake with which the present invention may be used reference is made to Patent No. 2,885,033 issued May 5, 1959.

Referring to FIGURE 1 which illustrates the present invention in combination with a conventional disk type brake in which relatively rotatable and nonrotatable brake members are clamped together for frictional engagement, it should be understood that the present invention is not limited to use with such a brake but may also be used with other types of brakes as well as clutches or similar devices where it is desired to maintain a predetermined clearance between wearable members.

A fluid motor 10 is mounted in a carrier plate 12 which serves as a housing for the fluid motor. A number of such fluid motors are spaced circumferentially around the carrier. Not all of the fluid motors need be equipped with the present invention. Only one fluid motor including the present invention is shown, however, it will be understood that additional duplicate motors may be provided as desired. The fluid motor 10 includes a pressure responsive piston 14 which is slidable in a cylinder bore 16 formed in the carrier plate 12 and a sealing plug 18 which is threadedly engaged with carrier plate 12 and which defines a closed end of the bore 16. The plug 18 and piston 14 together with carrier plate 12 define a fluid chamber 20 to which fluid under pressure is supplied by conventional fluid pressurizing apparatus, not shown, for energizing the piston 14 into engagement with a circumferentially fixed pressure plate 22. The pressure plate 22 may be secured to a fixed part of the vehicle in any well known manner such that rotative movement but not axial movement is prevented. The piston 14 forces the pressure plate 22 away from carrier plate 12 into engagement with a rotor 24 which turns either with the wheel or some other rotatable part of the vehicle. Additional plates, alternately rotors and stators may be stacked adjacently to the pressure plates in the usual manner.

Stepped bores 26 and 28 are provided in the piston 14 to accommodate the automatic adjuster and reset device generally indicated by numeral 30 and an annular shield of insulating material 32, respectively. The insulating material 32 serves as a heat barrier between the pressure plate 22 and piston 14 so that the heat transfer from the rotors and stators to the chamber 20 will be effectively reduced to thereby prevent vaporization of the fluid in chamber 20.

The adjuster and reset device includes a piston-positioning sleeve 36 which is sidably arranged in bore 26 and which is fixed to the piston 14 by means of a friction material ring 38. The friction ring 38 grips the outer surface of the sleeve 36 and the degree of gripping force of the ring is determined by a threaded nut 40 which bears against one side of the ring 38 which, in turn, is forced against the beveled side of a collar 42. It will be noted that the outermost side of the ring 38 and the beveled side of the collar 42 are inclined so that as the friction ring 38 is forced toward the left there is a wedging action which forces the ring more tightly against the outer surface of sleeve 36. The gripping force between the friction ring 38 and the sleeve 36 is varied as desired by turning down or backing off the nut 40. The sleeve 36 is provided with a closed end 46 which abuts a fixed stop 48 formed on the plug 18.

An elongated bolt or stem 50 extends through openings 52 and 54 formed in the plug 18 and the closed end 46 of the sleeve 36, respectively, into the interior of sleeve 36, the stem being aligned axially with the sleeve. A sleeve 56 is provided with a threaded portion 58 on its internal surface which threadedly engages a threaded portion 60 of stem 50. A lock screw 62 threadedly engaged with threaded portion 58 engages the end of a bolt 50 when tightened to thereby lock the sleeve 56 in position on bolt 50. The lock screw 62 is tightened by any suitable tool such an an Allen wrench which is inserted into recess 64 formed in lock screw 62. The sleeve 56 has a flange 66 formed on one end and a stop 68 formed on the opposite end. A helical spring 70 compressed within sleeve 36 between flange 66 of the sleeve 56 and the closed end 46 of the sleeve 36 serves to bias the closed end 46 away from stop 68 through a distance "D" into engagement with the fixed stop 48. It will be seen later in the description that the distance "D" corresponds to an established clearance for the brake.

The chamber 20 is sealed by means of a number of O ring seals 72 and 74, 76 and 78 and 80 disposed in suitable recesses in piston 14, plug 18 and the closed end 46 of sleeve 36. The fluid pressure in chamber 20 acts against the closed end 46 of sleeve 36 such that none of the effective area of the piston 14 is diminished by sleeve 36.

It will be noted that the O ring seal 74 is arranged at the left end of the friction ring 38 away from chamber 20. In this manner, it is possible to immerse the friction ring 38 in hydraulic fluid in order to attain a more stable coefficient of friction between the ring 38 and the piston-positioning sleeve 36. The fluid from chamber 20 permeates the friction ring 38 and coats the engageable surface of sleeve 36. The fluid acts as a lubricant which produces a more constant coefficient of friction between adjacent cooperating surfaces of the ring 38 and sleeve 36. Because of greater consistency in the coefficient of friction, the operation of the reset and adjusting device is less subject to variations.

In operation, fluid pressure is developed within chamber 20 by conventional fluid pressurizing apparatus, not shown, whereupon the piston 14 and sleeve 36 are concomitantly energized and move away from plug 18. The piston 14 engages the pressure plate 22 forcing the pressure plate into frictional engagement with the adjacent relatively rotatable rotor 24 and the stack of interleaved rotors and stators thus are frictionally compressed. This frictional engagement of the brake parts retards the vehicle.

As the piston 14 moves away from plug 18, the sleeve 36 moves also since the sleeve 36 and piston 14 are frictionally held together by the friction material ring 38. Movement of the sleeve 36 causes the spring 70 to be compressed between the closed end 46 and flange 66 such that, during the brake application, a part of the applying force is built-up within the device to serve as a retracting force on the sleeve 36 and piston 14 when the applied fluid pressure is released. Upon moving through the distance "D," the closed end 46 of sleeve 36 engages the stop 68 and further movement thereof is prevented.

If the extent of brake wear has caused the clearance of the brake to exceed distance "D," the piston 14 will continue to move relatively to sleeve 36 against the frictional resistance of the friction material ring 38 in response to the fluid pressure in chamber 20. This movement of piston 14, relatively to sleeve 36, urges the friction material ring 38 along the length of sleeve 36 to a new position thereon.

When the fluid pressure in chamber 20 is released, the spring 70 will urge the sleeve 36 toward plug 18 whereupon the closed end 46 engages the fixed stop 48. This retractile movement of the sleeve 36 is equal to the distance "D." The friction ring 38 causes the piston 14 to move with sleeve 36 through a like distance. It will be noted that even though the piston 14 might have been displaced along the length of sleeve 36 during a brake application, the extent of its retraction is equal to the distance "D" so that the brake clearance remains constant.

Assume next that the brake has "overadjusted" i.e., the brake clearance is less than the clearance "D" and the brakes are partially or fully applied even though the fluid pressure in chamber 20 is released. The reset operation of the device will now be described.

To relieve this brake dragging condition the brake pedal is depressed to cause an increase in the pressure in chamber 20. Since the piston 14 is already in engagement with the pressure plate 22, it cannot move further in a brake applying direction. The fluid pressure in chamber 20 acting against the closed end of sleeve 36 does, however, cause a movement of the sleeve 36 relatively to the piston 14 and in a direction toward the pressure plate 22 through the distance "D" until the closed end 46 engages the stop 68 on sleeve 56. It will be noted that spring 70 is compressed and sleeve 36 is moved against the resistance of the friction ring 38. When the fluid pressure in chamber 20 is released, the spring 70 forces the sleeve toward stop 48 through the distance "D." The piston 14 is caused to move through a like distance since the piston 14 and sleeve 36 are joined by the friction material ring 38. By thus initially moving the sleeve 36 toward the pressure plate 22 when the piston 14 is fixed, it is possible to retract piston 14 and reset the piston to its original clearance "D."

Referring next to the embodiment shown in FIGURE 2, it will be shown that by relocating the O ring seal 74 it is possible to seal the friction material ring 38 from the hydraulic fluid in order to keep the friction ring 38 and the surface of sleeve 36 against which the ring slides dry such that no lubricating effect is gained from the fluid in chamber 20.

The operation of the device shown in FIGURE 2 is the same as the device shown in FIGURE 1 heretofore described.

Referring next to the embodiment shown in FIGURE 3, parts of the device corresponding to those previously described will receive the same reference numeral and the subscript "a." Piston 14a is slidably mounted in cylinder bore 16a which is formed in carrier plate 12a. The cylinder bore 16a is sealed at one end by a threaded plug 18a.

The piston 14a and plug 18a together with carrier 12a define a fluid chamber 20a which receives pressurized fluid from a suitable pressure source, not shown.

A loading nut 40a is screwed onto a threaded portion of the piston 14a. The loading nut is cup-shaped and the turned-back portion 84 thereof is engageable with friction material ring 38a. Surrounding the friction ring 38a is a split collar 86 with the inner periphery thereof tapered to bias the friction ring 38a against the outer surface of sleeve 36a. The friction ring 38a grips the sleeve 36a to frictionally hold the piston 14a and sleeve 36a together.

At the end of the piston 14a and carried thereby is an annular shield of insulating material 32a which serves as a heat barrier for the fluid in chamber 20a so that the heat developed by frictional contact of the rotors and stators does not produce vaporization of the fluid. A sleeve 90, preferably made from stainless steel, is bonded to the inner surface of the annular shield 32a and is spaced from the sleeve 36a to provide an air gap therebetween which acts to reduce the transfer of heat between the inner surface of sleeve 90 and the outer surface of sleeve 36a.

A stem 92 is secured at one end to the plug 18a by a nut 94. The stem 92 extends through the closed end 46a of sleeve 36a and is provided with a flange 96 at its free end. A helical spring 70a is compressed between flange 96 and the closed end 46a. A shoulder 98 formed on the stem 92 is engaged by the closed end 46a of sleeve 36a during protractile movement of the sleeve 36a and acts as a stop to prevent subsequent movement of sleeve 36a with piston 14a. The helical spring 70a urges the closed end 46a into contact with the fixed stop 48a on plug 18a. The clearance between the shoulder 98 and the adjacent side of the closed end 46a is equal to the distance "D" which is the clearance maintained in the brake regardless of wear.

When the chamber 20a is pressurized, the piston 14a and sleeve 36a are energized accordingly and move away from fixed stop 48a. Upon movement of sleeve 36a through the clearance "D," the closed end 46a contacts the shoulder 98 whereupon the sleeve 36a is fixed in position. If brake wear necessitates further piston travel, then the piston 14a continues to move in a protractile direction in response to the fluid pressure in chamber 20a which overcomes the frictional resistance of the ring 38a. The friction material ring 38a is displaced along the length of the sleeve 36a which is fixed to a new position therein.

When the fluid pressure in chamber 20a is released, the spring 70a forces the sleeve 36a away from shoulder 98 through distance "D" whereupon the closed end 46a engages the fixed stop 48a. It will be noted that the piston 14a and sleeve 36a are retracted through the same distance "D" by virtue of the friction material ring 38a which holds the piston and sleeve together.

Assume next that the brake is dragging because the clearance "D" is lost due to "overadjustment." In this case, the operator pumps the brake pedal to pressurize chamber 20a. The piston 14a is held against movement in a brake applying direction since it is already producing brake application. The pressure in chamber 20a does, however, cause the sleeve 36a to move relative to piston 14a to the left as orientated in FIGURE 3 through the distance "D" against the resistance of spring 70a and friction material ring 38a. Upon engagement of the closed end 46a with shoulder 98, the sleeve 36a is fixed relative to the piston 14a. When the fluid pressure in chamber 20a is released, the sleeve 36a and piston 14a are retracted through the same distance "D" thereby re-establishing the brake clearance.

It will be noted that the O ring seal 74a is located in such a manner as to allow the friction material ring 32a and the adjacent cooperating surface of sleeve 36a to be immersed in fluid to obtain a more constant coefficient of friction.

Referring next to the embodiment shown in FIGURE 4, parts of the brake corresponding to those shown in FIGURE 2 have the same reference numeral but also include the subscript "b."

The piston 14b is slidable in cylinder bore 16b and responds to the fluid pressure developed in chamber 20b. The piston-positioning sleeve 36b is located within and is carried by piston 14b. The sleeve 36b and piston 14b are held together by the friction material ring 38b which is compressed between the two members by a clamping nut 40b.

Fluid leakage is prevented through the friction device by O ring seals 100 and 102 which are located in suitable recesses formed in clamping nut 40b. This arrangement of fluid seals is similar to that shown in FIGURE 3. The fluid from chamber 20b reaches the area around friction material ring 38b and permeates the ring as well as covering the adjacent cooperating surface of piston 14b.

With the exception of the sleeve 36b carrying the friction material ring 38b instead of the piston 14b, the parts of FIGURE 4 are identical to those shown in FIGURE 2.

The operation of the embodiment shown in FIGURE 4 is substantially the same as that of FIGURE 1. The piston 14b is moved relative to the sleeve 36b toward pressure plate 22b when the brake clearance "D" is exceeded and this position is maintained by means of the friction material ring 38b. During a resetting operation when the brake pedal is pumped, the piston 14b is fixed and the sleeve 36b moves relative to the piston 14b toward pressure plate 22b through the established distance "D" so that when the pressure is relieved the sleeve 36b and piston 14b are returned through a like distance.

Figure 5:
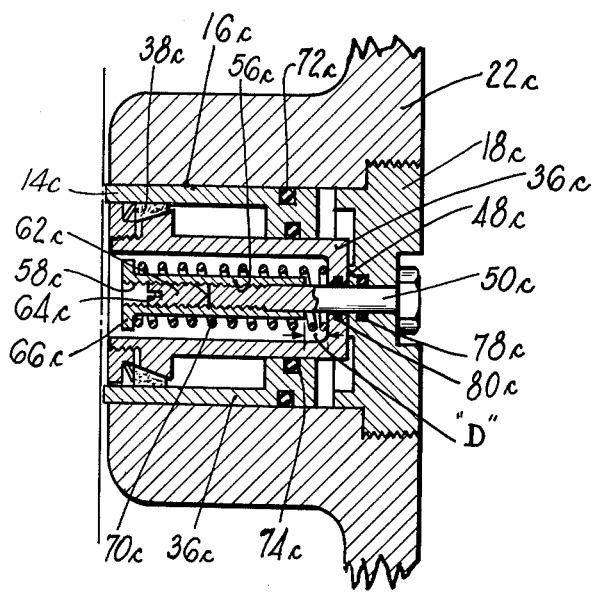

Referring next to the embodiment shown in FIGURE 5, there is a further embodiment of the invention. This embodiment, like that of FIGURE 4, differs from the one shown in FIGURE 1 in the location of the friction material ring and the surface on which the friction ring is slidable during adjustment and resetting of the brake.

In the embodiment shown in FIGURE 5, the threaded plug 18c is threadedly engaged with the carrier plate 22c and has attached thereto one end of the bolt or stem 50c. The piston 14c is slidable in bore 16c. The piston-positioning sleeve 36c is mounted in the piston 14c. A friction material ring 38c is wedged between the sleeve and the piston to frictionally hold these two members together. The "O" ring seals 72c and 74c are located in suitable recesses in piston 14c to prevent fluid flow from chamber 20c to the friction material ring 38c. Thus, the friction ring 38c as well as the adjacent cooperating surface of piston 14c are maintained dry as in the case of FIGURE 2. The adjuster and reset operation of this embodiment is the same as the device shown in FIGURE 4.

It will be noted that each of the embodiments shown in FIGURES 1, 2, 3, 4 and 5 is arranged such that the plug 18 can be screwed out of the carrier plate 22 and removed and will carry with it the piston 14 and all of the components of the adjuster and reset device since the plug 18 is fastened to the piston 14 and sleeve 36 through the bolt or stem 50. This is a decided advantage since the plug 18 is on the outboard side of the brake and can be reached without disassembling the rotors and stators which are on the opposite side of the carrier plate 22.

Although the invention has been described in conjunction with certain selected embodiments, it will be understood by those skilled in the art that numerous modifications and changes may be made of these examples without departing from the underlying principles of the invention.

I claim:

1. In a disk brake having a carrier member, a combination adjuster and reset device including a pressure responsive element having a bore formed therein, a fluid chamber adjacent one end of said bore, means for pressurizing the fluid in said chamber, an annular positioning member slidably mounted in said bore and provided with a closed end exposed to said fluid chamber, a friction member operatively connected to adjacent cooperating surfaces of said pressure responsive element and said positioning member whereby relative movement therebetween is resisted, a fixed stem secured to said carrier member and extending therefrom through the closed end of said positioning member, a fluid seal operatively connected to adjacent cooperating surfaces of said fixed stem and the closed end of said positioning member, a sleeve fixedly secured to said fixed stem and provided with a flanged portion at one end and a first stop member at the opposite end, a second stop member fixedly secured to said carrier member and spaced from said first stop member, resilient means interposed between said flanged portion and said closed end, said pressure responsive element and said positioning member being responsive to the fluid pressure in said chamber to cause application of said disk brake whereupon the closed end of said positioning member engages said first stop member to limit the movement of said positioning member to an established distance defined by the spacing of said first and second stop members, said resilient means being loaded by said positioning member during the protractile movement thereof so as to develop a force which acts to retract said positioning member and said pressure responsive element through said established distance when the fluid pressure is released, said pressure responsive element being adjustably movable in increments relative to said positioning member in response to said fluid pressure which overcomes the resistance of said friction member subsequent to engagement of said closed end with said first stop member whereby compensation is made for wear of the disk brake.

2. In a disk brake having a carrier member, a combination adjuster and reset device as set forth in claim 1 wherein said friction member is fixedly secured to said annular poistioning member and slidably engaged with an adjacent cooperating surface of said pressure responsive element.

3. In a disk brake having a carrier member, a combination adjuster and reset device as set forth in claim 1 wherein said friction member is fixedly secured to said pressure responsive element and slidably engaged with an adjacent cooperating surface of said annular positioning member.

References Cited in the file of this patent
UNITED STATES PATENTS

| | | |
|---|---|---|
| 2,866,526 | Wiseman | Dec. 30, 1958 |
| 2,888,109 | Tankersley | May 26, 1959 |

FOREIGN PATENTS

| | | |
|---|---|---|
| 804,826 | Great Britain | Nov. 26, 1958 |